United States Patent
Meerbeck et al.

(10) Patent No.: US 9,500,361 B2
(45) Date of Patent: Nov. 22, 2016

(54) METHOD AND DEVICE FOR CONTROLLING THE TEMPERATURE OF STEAM FOR A STEAM POWER PLANT

(75) Inventors: Bernhard Meerbeck, Kelkheim (DE); Joachim Rupp, Stutensee (DE);
(Continued)

(73) Assignee: SIEMENS AKTIENGESELLSCHAFT, München (DE)

( * ) Notice: Subject to any disclaimer, the term of this patent is extended or adjusted under 35 U.S.C. 154(b) by 940 days.

(21) Appl. No.: 13/258,100

(22) PCT Filed: Mar. 23, 2010

(86) PCT No.: PCT/EP2010/053741
§ 371 (c)(1),
(2), (4) Date: Dec. 1, 2011

(87) PCT Pub. No.: WO2010/108904
PCT Pub. Date: Sep. 30, 2010

(65) Prior Publication Data
US 2012/0072045 A1  Mar. 22, 2012

(30) Foreign Application Priority Data
Mar. 24, 2009  (EP) .................................... 09155997

(51) Int. Cl.
*F22G 5/00*  (2006.01)
*F01K 21/00*  (2006.01)
(Continued)

(52) U.S. Cl.
CPC ............... *F22G 5/123* (2013.01); *F01K 21/00* (2013.01); *F01D 21/00* (2013.01); *F01K 13/00* (2013.01); *G05B 17/02* (2013.01)

(58) Field of Classification Search
None
See application file for complete search history.

(56) References Cited

U.S. PATENT DOCUMENTS 3,588,265 A * 6/1971 Berry ................................ 15/17
3,931,500 A * 1/1976 Berkebile et al. ............ 376/217
(Continued)

FOREIGN PATENT DOCUMENTS

CN          1112693 A    11/1995
CN       101338892 A     1/2009
(Continued)

OTHER PUBLICATIONS

Boje, E. and Eitelberg, E., "Augmented Kalman Filtering for a Superheated Steam Header System", Sep. 2003, IEEE Transactions on Control Systems Technology, vol. 11, No. 5.*
(Continued)

*Primary Examiner* — Mohammad Ali
*Assistant Examiner* — Kelvin Booker

(57) ABSTRACT

A method for controlling the temperatures of steam for a steam power plant is provided. A state controller, in order to output a desired steam temperature as a controlled variable, feeds back several steam states in a superheater for superheating steam using a monitor, which calculates the steam states, and the desired steam temperature is forwarded to a further controller for controlling the temperature. In order to achieve a stable and accurate control of the steam temperature, it is proposed that the state controller be a linear quadratic controller.

17 Claims, 3 Drawing Sheets

US 9,500,361 B2

Page 2

(75) Inventors: Michael Treuer, Lorch (DE); Tobias Weissbach, Schorndorf (DE); Klaus Wendelberger, St. Leon-Rot (DE)

(51) Int. Cl.
*F01K 13/00* (2006.01)
*F01D 21/00* (2006.01)
*G05B 17/02* (2006.01)
*F22G 5/12* (2006.01)

(56) References Cited

U.S. PATENT DOCUMENTS

| | | | |
|---|---|---|---|
| 4,241,701 A | 12/1980 | Morse | |
| 4,277,943 A * | 7/1981 | Silvestri, Jr. | F01K 3/22 60/646 |
| 4,577,270 A * | 3/1986 | Sugano et al. | 700/31 |
| 4,628,462 A * | 12/1986 | Putman | F01K 17/02 60/660 |
| 4,791,889 A | 12/1988 | Matsako et al. | |
| 5,311,421 A * | 5/1994 | Nomura et al. | 700/37 |
| 6,052,647 A * | 4/2000 | Parkinson et al. | 701/23 |
| 6,089,507 A * | 7/2000 | Parvez et al. | 244/158.8 |
| 6,301,895 B1 * | 10/2001 | Kallina | F01K 13/02 60/646 |
| 6,341,249 B1 * | 1/2002 | Xing et al. | 701/13 |
| 6,377,878 B1 * | 4/2002 | Feddema et al. | 701/27 |
| 6,494,045 B2 * | 12/2002 | Rollins, III | 60/773 |
| 6,606,848 B1 * | 8/2003 | Rollins, III | 60/39.182 |
| 6,748,733 B2 * | 6/2004 | Tamaro | 60/39.182 |
| 7,055,328 B2 * | 6/2006 | Huengerle et al. | 60/660 |
| 7,131,259 B2 * | 11/2006 | Rollins, III | 60/39.182 |
| 8,185,217 B2 * | 5/2012 | Thiele | 700/29 |
| 8,200,346 B2 * | 6/2012 | Thiele | 700/44 |
| 8,200,369 B2 * | 6/2012 | Cheng et al. | 700/287 |
| 8,247,919 B2 * | 8/2012 | Hoffmann et al. | 290/52 |
| 8,644,961 B2 * | 2/2014 | Wroblewski et al. | 700/28 |
| 2002/0029558 A1 * | 3/2002 | Tamaro | 60/39.182 |
| 2002/0065791 A1 | 5/2002 | Magee | |
| 2003/0100974 A1 * | 5/2003 | Alvarez | G05B 19/41885 700/286 |
| 2004/0129002 A1 * | 7/2004 | Huengerle et al. | 60/772 |
| 2005/0107895 A1 * | 5/2005 | Pistikopoulos | G05B 17/02 700/52 |
| 2005/0209714 A1 * | 9/2005 | Rawlings | G05B 13/048 700/29 |
| 2006/0204412 A1 * | 9/2006 | Rizzo et al. | 422/198 |
| 2006/0233637 A1 * | 10/2006 | Yakushi | F01D 17/00 415/13 |
| 2007/0055392 A1 * | 3/2007 | D'Amato | G05B 13/048 700/44 |
| 2007/0156288 A1 * | 7/2007 | Wroblewski et al. | 700/266 |
| 2007/0204623 A1 * | 9/2007 | Rollins, III | 60/772 |
| 2007/0255991 A1 * | 11/2007 | Kaushal et al. | 714/733 |
| 2008/0071395 A1 * | 3/2008 | Pachner | G05B 13/048 700/34 |
| 2009/0012653 A1 * | 1/2009 | Cheng | F23N 5/242 700/287 |
| 2009/0198350 A1 * | 8/2009 | Thiele | G05B 13/042 700/30 |
| 2009/0211252 A1 * | 8/2009 | Tani | F01K 7/345 60/645 |
| 2010/0005775 A1 * | 1/2010 | Kipping | 60/39.182 |
| 2010/0204808 A1 * | 8/2010 | Thiele | 700/30 |
| 2010/0281877 A1 * | 11/2010 | Asanaka et al. | 60/778 |
| 2011/0018265 A1 * | 1/2011 | Hoffmann et al. | 290/7 |
| 2011/0208341 A1 * | 8/2011 | Stadler et al. | 700/104 |
| 2012/0072045 A1 * | 3/2012 | Meerbeck | F22G 5/123 700/300 |
| 2012/0304617 A1 * | 12/2012 | Kipping | 60/39.182 |
| 2013/0133751 A1 * | 5/2013 | Backi | F01K 13/00 137/11 |

FOREIGN PATENT DOCUMENTS

EP 0285297 A2 10/1988
GB 2449998 A 12/2008

OTHER PUBLICATIONS

Isomursu, P. and Rauma, T., "A Self-Tuning Fuzzy Logic Controller for Temperature Control of Superheated Steam", Jun. 1994, Proceedings of the 3rd IEEE Conference on Fuzzy Systems, 1994.*
Jin, X.-Z. and Li, Q., "The Application of Multiple Model Adaptive Control to Superheated Steam Temperature", Jul. 2009, Proceedings of the 8th International Conference on Machine Learning and Cybernetics, Boading.*
Liu, X.-J. and Chan, C.W., "Neuro-Fuzzy Generalized Prodictive Control of Boiler Steam Temperature", Dec. 2006, IEEE Transactions on Energy Conversion, vol. 21, No. 4.*
Lixiang, Z., Aiqin, J. and Dongchen, H., "The Big Capacity Boiler Superheated Steam Temperature Fuzzy-Smith Control System", Jun. 2002, Proceedings of the 4th World Congress on Intelligent Control and Automation.*
Luan, X.-C., Li, S.-Y. and Li, L.L., Adaptive Control for the Superheated Steam Temperature based on Multi-Model State Observer, Aug. 2004, Proceedings of the 3rd International Conference on Machine Learning and Cybernetics.*
Peng, D.G., Zhang, H., Yang, P. and Wang, Y., "Internal Model Control Based on Parallel Self-Learning Neural Network for Superheated Steam Temperature System", 2006.*
Qiu, X.-Z.. Zhang, L.-M., Zhou, J.X., Si, F.-Q., Xu, Z.-G., "Research and Application of Predictive Control Based on EMRAN in Superheated Steam Temperature Control System", Jan. 2009, pp. 742-746.*
Wang, N.; Jiao, S.-M.; Wang, D.F.; Qi, S.R. and Han, P., "Application of Fuzzy Predictive Control in Superheated Steam Temperature Control", Aug. 2006, Proceedings of the 5th Intl. Conf on Machine Learning and Cybernetics.*
Xie, K.; Hao, W.; and Xie, J., "Superheated Steam Temperature Cascade Control System Based on Fuzzy-Immune PID", 2007, 4th Intl Conf on Fuzzy Systems and Knowledge Discovery (FSKD 2007).*
Zhang, L.; Zhang, Y.; Wang, D. and Xu, D., "Multiple Models Generalized Predictive Control for Superheated Steam Temperature Based on MLD Model", Aug. 2007, Proceedings of the IEEE Intl Conference on Automation and Logistics.*
Zhang, J.; Hou, G. and Zhang, J., "Adaptive Neuro-Control System for Superheated Steam Temperature of Power Plant over Wide Range Operation", 2006, Proceedings of the 6th Intl Conf. on Intelligent Systems Design and Applications (ISDA '06).*
Peng, D.G.; Zhang, H.; Yang, P. and Wang, Y., "Internal Model Control Based on Parallel Self-Learning Neural Network for Superheated Steam Temperture System", May 2006, 1st IEEE Conference on Industrial Electronics and Applications, 2006.*
Zhi-Gang, H.; Hua, H.; Jian-Hong, L. and Tie-Jun, Z., "Research and Application of a New Predictive Control Based on State Feedback Theory in Power Plant Control System", Sep. 2007, IEEE Congress on Evolutionary Computation.*
Zhingang, Z. and Chenghui, Z., "Control Strategy Analysis of Superheated Temperature System for Large-Scale Thermal Power Generation", Aug. 2006, Proceedings of the 25th Chinese Control Conference.*
Silva, R.N.; Shirley, P.O.; Lemos, J.M. and Goncalves, A.C., "Adaptive Regulation of Super-Heated Steam Temperature: A Case Study in an Industrial Boiler", 2000, Control Engineering Practice, vol. 8, pp. 1405-14-15.*
Moelbak, T., "Advanced Control of Superheater Steam Temperatures—An Evaluation Based on Practical Applications", Mar. 1998, Control Engineering Practice vol. 7, pp. 1-10.*
Sanchez-Lopez, A.; Arroyo-Figueroa, G. and Villavicencio-Ramirez, A., "Advanced Control Algorithms for Steam Temperature Regulation of Thermal Power Plants", 2004, Electrical Power and Energy System, vol. 26, pp. 779-785.*

(56) References Cited

OTHER PUBLICATIONS

Ghaffari, A.; Chaibakhsh, A. and Lucas, C., "Soft Computing Approach for Modeling Power Plant with a Once-Through Boiler", Engineering Applications of Artificial Intelligence, vol. 20, pp. 809-819.*

Ghaffari, A.; Mehrabian, A.R. and Mohammad-Zaheri, M., "Identification and Control of Power Plant de-Superher Using Soft Computing Techniques", Sep. 2005, Engineering Applications of Arificial Intelligence, vol. 20, pp. 273-287.*

Chaibakhsh, A.; Ghaffari, A. and Moosavian, A.A., "A Simulated Model for a Once-Through Boiler by Parameter Adjustment Based on Genetic Algorithms", Nov. 2006, Simulation Modelling Practice and Theory, vol. 15, pp. 1029-1051.*

Benyo, I., "Cascade Generalized Predictive Control—Applications in Power Plant Control", Apr. 2006.*

Codrons, B., "LQG Control of Steam Temperature in Power Plants", Sep. 2003, 2003 European Control Conference (ECC).*

Moelbak, T., "Advanced Control of Superheater Steam Temperatures—An Evaluation Based on Practical Applications", Mar. 1998, Control Engineering, vol. 7, pp. 1-10.*

Berkan, R.C.; Upadhyaya, B.R. and Kisner, R.A., "Implementation of Multivariable Control Techniques with Application to Experimental Breeder Reactor II", Jun. 1990, Oak Ridge National Laboratory, U.S. Department of Energy, ORNL/TM-11134.*

Cho, B.H. and No, H.C., "Design of Stability and Performance Robust Fuzzy Logic Gain Scheduler for Nuclear Steam Generators", Jun. 1997, IEEE Transactions on Nuclear Science, vol. 44, No. 3.*

Kim, B.H.; Park, Y.-M.; Choi, M.-S. and Lee, J.-W., "LQG/LTR Robust Controller of Congeneration Plant for Disturbance Rejection in Electric Frequency and Steam Pressure", 1996, Electrical Power and Energy Systems, vol. 18, No. 4, pp. 239-250.*

Lee, Y.J., "Optimal Design of the Nuclear Steam Generator Digital Water Level Control System", Sep. 1993, Journal of the Korean Nuclear Society, vol. 26, No. 1, Mar. 1994.*

Lee, Y.J.; Lee, H.J. and Kim, K.Y., "The Level Control System Design of the Nuclear Steam Generator for Robustness and Performance", Aug. 11, 1999, Journal of the Korean Nuclear Society, vol. 32, No. 2, pp. 157-168, Apr. 2000.*

Zareh, S.H., Jahromi, A.F., Abbasi, M. and Khayyat, A.A., "The Control of a Thermal System with Large Time Delay Using of LQG and Lead-Compensator", Aug. 4-7, 2010, Proceedings of the 2010 IEEE International Conference on Mechatronics and Automation.*

* cited by examiner

METHOD AND DEVICE FOR CONTROLLING THE TEMPERATURE OF STEAM FOR A STEAM POWER PLANT

CROSS REFERENCE TO RELATED APPLICATIONS

This application is the US National Stage of International Application No. PCT/EP2010/053741, filed Mar. 23, 2010 and claims the benefit thereof. The International Application claims the benefits of European Patent Office application No. 09155997.1 EP filed Mar. 24, 2009. All of the applications are incorporated by reference herein in their entirety.

FIELD OF INVENTION

The invention relates to a method for controlling the temperature of steam for a steam power plant, wherein a state controller feeds back a plurality of steam states in a superheater for superheating the steam using an observer, which calculates said states, feeds said states back for the output of a steam target temperature as a manipulated variable, and the steam target temperature is forwarded to a further controller for controlling the temperature.

BACKGROUND OF INVENTION

The efficiency of a steam power plant increases with increasing temperature of the steam produced in the steam boiler. However, upper limits for the temperature of the boiler pipe material and of the turbine upon which the steam acts must not be exceeded. The more precisely the temperature can be kept to the target value, then the closer the target value can be kept to the admissible temperature limit, i.e. the higher the efficiency level that can be achieved during operation of the generating plant.

Superheating of the steam in the boiler is achieved in that the steam is fed through the heated bank of pipes in several stages—the superheating stages. Control of the steam temperature is carried out by injecting water into the steam tube before the superheating stage via suitable injection valves. The superheaters with their very large masses of iron exhibit very sluggish behavior. Adjustment of the injection valve has an effect on the temperature being controlled only after several minutes. The time delay is not constant, but depends on the momentary steam mass flow rate. Furthermore, the temperature to be controlled is strongly influenced by numerous disturbances such as load changes, soot build-up in the boiler, changes of fuel, etc. For these reasons, precise temperature control is difficult to achieve.

Cascade control, in which two nested PI control loops are built up is known for solving this problem. An outer, slow PI controller controls the temperature at the superheater exit and outputs a target value for the temperature at the superheater entry—i.e. following the injection. The temperature at the superheater entry is adjusted by an inner, rapid PI controller which adjusts the injection valve. Disturbances of the steam temperature at the entry point of the injection can thus be rapidly corrected. The disadvantage of this concept is that disturbances which affect the superheater itself can only be corrected in the outer, slow circuit—i.e. with low control quality.

SUMMARY OF INVENTION

It is an object of the invention to provide a method with which the steam temperature can be controlled both precisely and stably.

This object is achieved in that, according to the invention, the state controller is a linear quadratic regulator. With a linear quadratic regulator (LQR) of this type, or expressed differently, a linear quadratic optimum state feedback, what is involved is a state controller the parameters of which can be determined such that a quality criterion for the control quality is optimized. By this means, both precise and stable control can be achieved. The invention is based on the concept that for state control, a plurality of—sometimes not measurable—states are fed back in order to determine the controller actuating signal. In the present application, this means that the temperatures at a plurality of points along the superheater are also used in the algorithm. However, since these temperatures are not measurable, an observing circuit is needed, with the help of which the required temperature values can be estimated or calculated. The expressions "estimate", "calculate" and "determine" are used synonymously in the following. The advantage of this concept lies therein that it is possible to react very rapidly and accurately to disturbances which affect the superheater.

The steam power plant is a plant that is powered by the energy of steam. It can be a steam turbine, a steam process plant or any other plant that is operated by energy derived from steam.

In the following, a state controller can be understood to be a control loop which controls the controlled variable on the basis of a state space representation. The state of the controlled system is passed, that is, fed back by an observer to the controlled system. The feedback which, together with the controlled system, forms the control loop, is carried out by the observer which takes the place of a measuring device and the state controller itself. The observer calculates the states of the system, in this case, of the steam in the superheater. The observer comprises a state differential equation, an output equation and an observer vector. The output of the observer is compared with the output of the controlled system. The difference acts, via the observer vector, on the state differential equation.

In an advantageous embodiment of the invention, the observer is a Kalman filter which is designed for linear quadratic state feedback. The interplay of the LQR and the Kalman filter is designated an LQG (Linear Quadratic Gaussian) algorithm.

Advantageously, the disturbance variable of the heat transferred by the superheater to the steam is defined as a state and is used in the control algorithm. Not only the temperatures or a parameter derived therefrom along the superheater, but also the disturbance variable can be defined as a state and estimated or determined with the aid of the observer. Disturbances which act directly on the superheater are expressed in that the heating-up duration in the superheater is altered. This type of observing of the disturbance variables makes possible a very fast, accurate but also robust reaction to respective disturbances.

A further advantageous embodiment of the invention provides that enthalpies of the steam are used as state variables. The use of enthalpies rather than steam temperatures can linearize the control system and thus make a simpler calculation available. The LQR method relates to linear control problems. However, due to the uptake of heat, the temperature at the entry to the superheater does not have a linear effect on the controlled variable of temperature at the output. By means of consistent conversion, particularly of all measured temperature values and target values to enthalpies, linearization of the control problem is achieved, since there is a linear relationship between the entry enthalpy and the exit enthalpy. The conversion is suitably carried out with the aid of relevant water/steam table relations using the measured steam pressure. This linearization brings about a very robust control response, i.e. the control quality no longer depends on the momentary operating point of the system.

It is also proposed that the state feedback takes place via a matrix equation, the parameters of which are determined at least partly by using momentary measured values. With an online calculation of the feedback matrix, the controller can be constantly adapted to the actual operating conditions. A load-dependent change in the dynamic superheating behavior is thus, for example, automatically taken into account. By this means also, the robustness of the control algorithm can be increased. Due to the fact that the controller algorithm is very robust, during commissioning, only very few parameters have to be adjusted. The commissioning time and effort is therefore significantly reduced compared with all previously known methods.

Advantageously, the matrix equation is calculated by means of control technology of the steam power plant. The control technology can be a control system which controls the steam power plant during the normal operation thereof. In order to keep the mathematical components of the control technology simple, it is advantageous if the matrix equation is converted into a set of scalar differential equations. A relatively simple integration of the matrix equation can be achieved by integrating in reverse over time. Since in a real case, no information is available from the future, integration equivalent to reverse integration can be achieved if the set of scalar differential equations is integrated with signs reversed, which reliably leads to the same stationary solution.

The invention also relates to a device for controlling the temperature of steam for a steam power plant with a state controller for outputting a steam target temperature as the manipulated variable by feeding back a plurality of steam states of a superheater for superheating the steam, an observer which calculates said states, and a further controller for controlling the temperature on the basis of the steam target temperature.

It is proposed that the state controller is a linear quadratic controller. Precise and stable regulation can thereby be achieved.

Advantageously, the device is configured to carry out one, several or all of the above proposed method steps.

BRIEF DESCRIPTION OF THE DRAWINGS

The invention will now be described in greater detail making reference to exemplary embodiments illustrated in the drawings, in which.

DETAILED DESCRIPTION OF INVENTION

Figure 1:
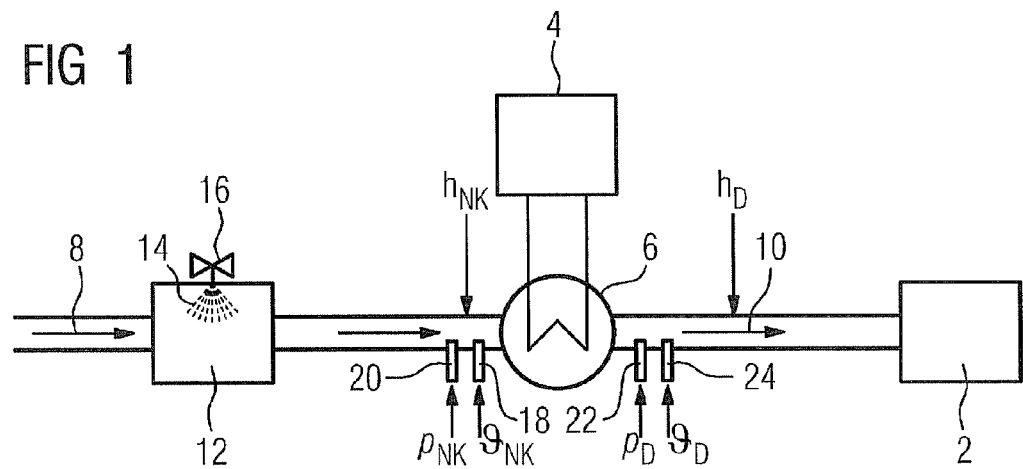
FIG. 1 is a portion of a steam power plant having a superheater.

FIG. 1 shows a schematic representation of a portion of a steam power station comprising a steam turbine as the steam power plant 2, a boiler 4, which emits heat to a superheater stage, e.g. of a multi-stage superheater 6, through which steam 8 flows. By the uptake of heat, the steam 8 in the superheater 6 is superheated to live steam 10 and is subsequently fed to the steam turbine. In order to control the temperature of the steam 8, an injection cooler 12 is provided which injects water 14 into and thereby cools the steam 8. The quantity of water 14 injected is set by a control valve 16. A temperature sensor 18 and a pressure sensor 20 measure the temperature $\theta_{NK}$ and the pressure $p_{NK}$ of the steam 8 before the superheater 6 and a temperature sensor 22 and a pressure sensor 24 measure the live steam temperature $\theta_D$ and the live steam pressure $p_D$ of the live steam 10 following the superheater 6.

Purely for the purpose of greater clarity, in the following, the steam 8 before the superheater 6 is designated steam 8 and the steam 10 after the superheater 6 is designated live steam 10, and it should be emphasized that the invention in the embodiment described below is naturally also applicable to steam which might not be designed live steam.

Figure 2:
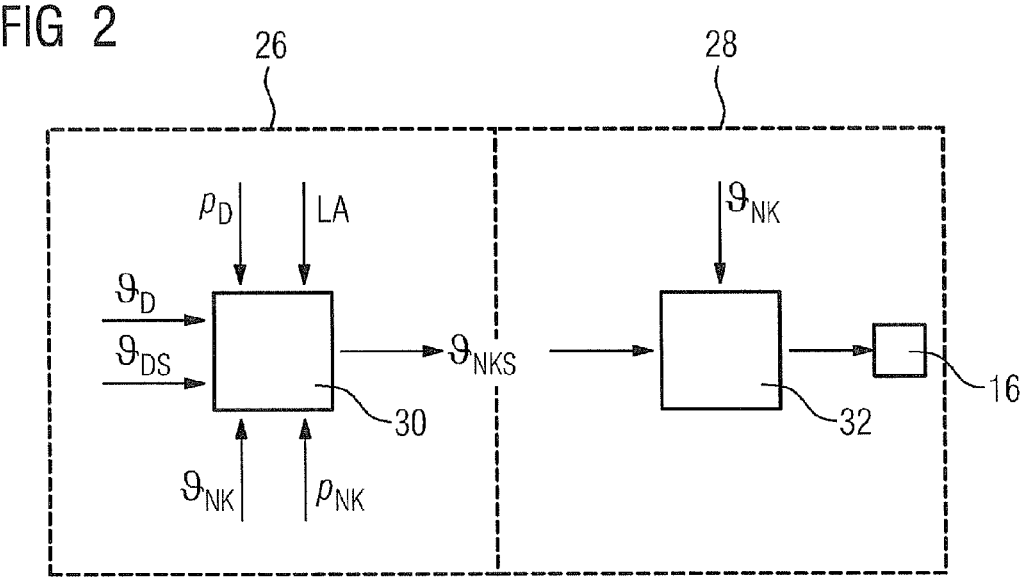
FIG. 2 is a schematic illustration of a cascade control system.

FIG. 2 shows schematically a cascade control system with an outer cascade 26 and an inner cascade 28. The outer cascade 26 comprises an LQG controller 30 to which the live steam temperature $\theta_D$ and the target value $\theta_{DS}$ thereof, the live steam pressure $p_D$ and the temperature $\theta_{NK}$ or pressure $p_{NK}$ of the steam 8 are fed as the input variables. A further input is the momentary load signal LA, which is needed for load-dependent adaptation of the superheater time constants. The live steam temperature $\theta_D$ after the superheater 6 is the controlled variable of the LQG controller 30. The target temperature $\theta_{NK}$ is output by the LQG controller 30 as a manipulated variable.

The target temperature $\theta_{NKS}$ of the steam 8 is predefined for a control loop 32 of the inner cascade 28 as a target value. The temperature $\theta_{NK}$ of the steam 8 following the injection cooler 12 is the controlled variable of the control loop 32. The manipulated variable of the control loop 32 is the setting of the control valve 16 of the injection cooler 12 and the control loop 32 controls the temperature $\theta_{NK}$ by means of the quantity of water 14 injected into the steam 8.

However, the LQG controller 30 does not act directly on the process via a regulating unit, but passes the target value $\theta_{NKS}$ for the temperature following the injection cooler 12 to the subordinate control loop 32, with which said LQG controller thus forms a cascade of the outer cascade 26 and the inner cascade 28. The temperature NK measured following the injection cooler 12 is required by the LQG controller 30 as additional information, along with the steam pressure $p_{NK}$ following the injection cooler 12 and the live steam pressure $p_D$, since enthalpies are calculated internally from temperatures and pressures. A saturated steam limitation of the temperature target value $\theta_{NKS}$ following the cooler 12 takes place outside the LQG controller component 30.

For the parameterization of the LQG controller 30, a time constant $T_{100}$ which describes the superheater dynamic behavior at full load is needed. A change in the steam temperature $\theta_{NK}$ at the superheater entry affects the live steam temperature $\theta_D$ in such a way as described by a delay through three $PT_1$ elements each having a time constant $T_{100}$. A time constant $T_{mess}$ which describes the behavior of the live steam temperature measurement is also needed.

The behavior of the controller is parameterized by means of the two setting values R and $R_K$, which describe the sensitivity of the state controller and of the Kalman filter.

Figure 3:
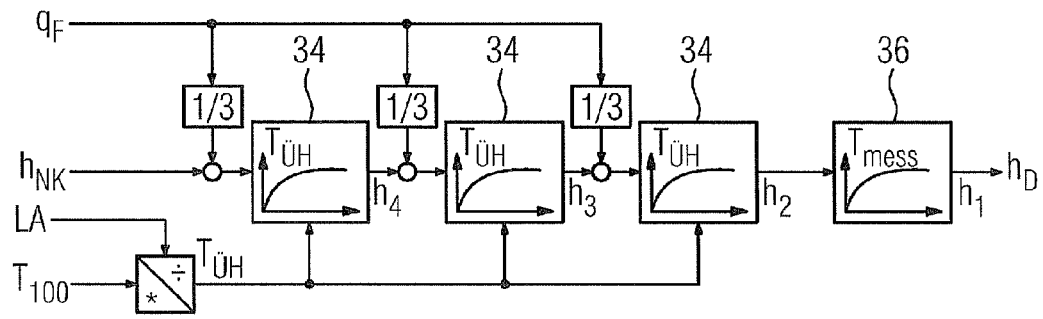
FIG. 3 is a model of a superheater.

FIG. 3 shows a model of the superheater section in the superheater 6, comprising three $PT_1$ elements 34. In the following, a $PT_1$ element 34 is understood to be a linear transmission element which has a first-order time delay. The three PT$_1$ elements 34 represent the transmission behavior of a delay from the specific enthalpy h$_{NK}$ at the entry to the superheater 6, that is, following the cooler 12, to the specific enthalpy h$_D$ of the live steam 10. In this context, it is enthalpies, rather than temperatures that are used for calculation, since the assumption of linear behavior is then justified. The quotient of T$_{100}$ and the load signal LA serves as the time constant T$_{ÜH}$ for the PT$_1$ elements 34, wherein the load-dependent dynamic behavior of the superheater is approximated. Given a smaller load, the flow speed of the steam 8 through the superheater and the response behavior become correspondingly more sluggish.

The heat transfer q$_F$ from the boiler 4 leads to a steam-side enthalpy increase across the superheater 6. In the model, this takes place through the addition of a third of the specific heat input at the input of each PT$_1$ element 34. The measuring element delay in the live steam temperature measurement is modeled with a further PT$_1$ element 36 which has the time constant T$_{mess}$. A regulating element dynamic is deliberately not included in the model on which the state controller, that is, part of the LQG controller 30, is based.

From the viewpoint of the model under consideration, the supply of heat q$_F$ from the boiler 4 represents a disturbance variable that is not measured directly. It is therefore known for controllers to carry out a dynamic extension of the system. This addition of an I component enables the prevention of remaining system deviations. Since, however, q$_F$ is not a slowly changing variable, but rather represents a large part of the fluctuating disturbances acting on the superheater 6, in this way, disturbances originating from the combustion are overwhelmingly corrected via this I component and not via the actual state controller.

In the case of the LQG controller 30, the disturbance variable q$_F$ is reconstructed by an observer that is implemented and is applied accordingly, so that the dynamic extension of the system model with a subsequent I component is not necessary.

The controlled variable of the LQG controller 30 is the temperature of the live steam θ$_D$. Since, however, the state controller under consideration in this case is based on a model using enthalpies, the live steam temperature θ$_D$ is converted, with the aid of the live steam pressure p$_D$ and a steam table, into the specific enthalpy h$_D$ of the live steam 10. For the linear state controller, h$_D$ is the controlled variable.

The state controller under consideration should not act directly on the injection cooler control valve 16. The well-trusted cascade structure, according to which the subordinate control loop 32, for example, a PI controller, controls the temperature θ$_{NK}$ after the injection cooler 12 by means of the control valve 16 to a target value θ$_{NKS}$, is to be maintained. This target value θ$_{NKS}$ is therefore the manipulated variable for the outer cascade formed by the state controller. The target value θ$_{NKS}$ is again formed, with the aid of the pressure and the steam table, from the enthalpy h$_{NKS}$. The linear state controller therefore has the manipulated variable h$_{NKS}$.

A state controller forms the controller output thereof as the weighted sum of the states of the system model. In the present modeled case, said states are the outputs of the four PT$_1$ elements 34, 36, identified in FIG. 3 as h$_1$ to h$_4$.

However, the four states h$_1$ to h$_4$ are not used directly for the control, but rather the deviation of the states from their operating point. For h$_1$ and h$_2$, said operating point is given by the enthalpy target value h$_{DS}$, and for h$_3$ and h$_4$, the operating point lies 1/3 q$_F$ and 2/3 q$_F$ therebelow, respectively. The sum weighted with k$_1$ to k$_4$ is therefore given by $$A_1 = k_1(h_1 - h_{DS}) + k_2(h_2 - h_{DS}) + k_3\left(h_3 - h_{DS} - \frac{1}{3}q_F\right) +$$

$$k_4\left(h_4 - h_{DS} - \frac{2}{3}q_F\right)$$

$$= k_1(h_1 - h_{DS}) + k_2(h_2 - h_{DS}) + k_3(h_3 - h_{DS}) +$$

$$k_4(h_4 - h_{DS}) - \frac{1}{3}(k_3 + 2k_4)q_F$$

$$= \sum_{i=1}^{4} k_i(h_i - h_{DS}) - \frac{1}{3}(k_3 - 2k_4)q_F$$

The deviation of each state from the operating point thereof—and therefore also the weighted sum A$_1$—becomes zero at the operating point, i.e. no controller intervention takes place. However, the manipulated variable h$_{NKS}$ should not be zero at the operating point, but should lie below the enthalpy target value of the live steam h$_{DS}$ by the amount of the heat uptake q$_F$. Using this offset, the controller rule can now be defined as $$h_{NKS} = h_{DS} - q_F - A_1 \tag{1}$$

$$= h_{DS} - \left(1 - \frac{1}{3}k_3 - \frac{2}{3}k_4\right)q_F - \sum_{i=1}^{4} k_i(h_i - h_{DS})$$

The heat uptake q$_r$ can be considered herein to be a disturbance variable, which is fed forward weighted as $$k_5 = 1 - \frac{1}{3}k_3 - \frac{2}{3}k_4 \tag{2}$$

With the disturbance variable compensation k$_5$q$_F$, the fact that the target values for h$_3$ and h$_4$ differ from h$_{DS}$ is also compensated for. The term h$_{DS}$−k$_5$q$_F$ can be included as a control branch and remains as feedback:

$$-\sum_{i=1}^{4} k_i(h_i - h_{DS}) = -\sum_{i=1}^{4} k_i x_i \text{ where } x_i = (h_i - h_{DS}), \tag{3}$$

$$i = 1, \ldots, 4$$

Figure 4:
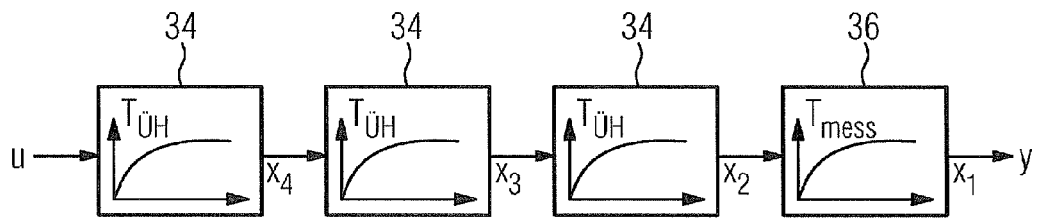
FIG. 4 is a linear system model as the basis for a controller design.

The intrinsic behavior of the controlled system can only be influenced by feedback. Therefore, a system model from which the control branch and the disturbance variable have been eliminated will now be examined. The result is a chain of PT$_1$ elements 34, 36, as shown in FIG. 4.

Expressed in matrix form, the chain of PT$_1$ elements 34, 36 is represented with a state space representation having the form $$\dot{x}(t) = Ax(t) + bu(t)$$

$$y(t) = c^T x(t)$$

with the state vector $$x(t) = \begin{bmatrix} x_1(t) \\ x_2(t) \\ x_3(t) \\ x_4(t) \end{bmatrix}$$

and the system matrices $$A = \begin{bmatrix} \frac{-1}{T_{mess}} & \frac{1}{T_{mess}} & 0 & 0 \\ 0 & \frac{-1}{T_{\ddot{U}H}} & \frac{1}{T_{\ddot{U}H}} & 0 \\ 0 & 0 & \frac{-1}{T_{\ddot{U}H}} & \frac{1}{T_{\ddot{U}H}} \\ 0 & 0 & 0 & \frac{-1}{T_{\ddot{U}H}} \end{bmatrix},$$

$$b = \begin{bmatrix} 0 \\ 0 \\ 0 \\ \frac{1}{T_{\ddot{U}H}} \end{bmatrix} \text{ and } c^T = [1 \ 0 \ 0 \ 0].$$

The intrinsic behavior of the system is represented by the characteristic values of the A-matrix, which are equivalent to the poles of the transfer function. A pole is produced at $-1/T_{mess}$ and triple pole at $-1/T_{\ddot{U}H}$. Since all the poles have a negative real part, the system is stable. Since the imaginary parts of all the poles are zero, and therefore no complex conjugate pole pairs exist, the system is not capable of oscillating, so that no overshooting can occur. The speed of build-up or decay is definitively described by the values of the real parts of the poles.

If the control loop is closed by the state feedback $$u = -\sum_{j=1}^{4} k_j x_j = -k^T x \qquad (4)$$

with the controller gain $$kT = [k_1 k_2 k_3 k_4]$$

then it follows that $$x(t) = (A - bk^T)x(t).$$

The intrinsic behavior of the closed control loop is represented by the characteristic values of the matrix $(A-bk^T)$. By suitable choice of the controller gain $k^T$, these characteristic values, that is, the poles of the closed control loop change, as does also the behavior of the system. For example, a displacement of the poles "to the left", i.e. a more strongly negative real part, makes the system faster.

A suitable method is needed for choosing the controller gain $k^T$. The LQ control problem formulates a compromise between control effort and control quality, although it dispenses with forcing the aperiodic behavior and thus achieves significantly greater robustness.

Evaluation of the control quality and of the control effort is carried out with the cost functional $$1 = \int_{t=0}^{\infty} [x(t)Qx(t) + u(t)ru(t)]dt.$$

Deviations of the states are integrated quadratically with the matrix Q, and the quadratic control effort is weighted with r and is integrated over time. If, for example, an uncontrolled, stable system such as the superheater system in FIG. 4 is observed, then an initial disturbance of the states decays completely over time. The functional assumes a particular finite value. If the control loop is now closed and more rapid decay behavior thereby brought about, then the contribution of the states to the value of the functional becomes smaller and the control quality improves. However, the control effort is now added to the controlling out of the initial disturbance. In the case of a very aggressive controller, the cost functional can even assume a higher value than in the uncontrolled system. Minimizing the cost functional therefore represents a compromise between control quality and control effort.

Since the control quality is found with a weighted quadratic total of the states, influence can be exerted over what "good control quality" is by means of the choice of the matrix Q. As a rule, only the main diagonal of Q is occupied, such that the squares of the individual states are evaluated, but not products of two states. The weighting of the control effort is carried out with the factor r. In order to influence the relationship between control quality and control effort, it is sufficient to vary r and to leave Q unaltered. For example, a doubling of each entry in Q can be omitted and, as an equivalent, expressed as a halving of the value of r, which then leads to a minimizing of the 0.5-times cost functional and leads to the same result.

The minimization problem wherein the controller rule $$u(t) = -k^T x(t)$$

is used and the controller gain $k^T$ is sought for which the cost functional is a minimum, leads to the matrix Riccati differential equation (MRDE) for a matrix P(t) as described in numerous literature sources:

$$-\frac{dP}{dt} = A^T P + PA - \frac{1}{r} Pbb^T P + Q \qquad (5)$$

With the steady-state solution P of this MRDE, finally the controller gain $k^T$ is given by $$k^T = [k_1 \ k_2 \ k_3 \ k_4] = \frac{1}{r} b^T P. \qquad (6)$$

Figure 5:
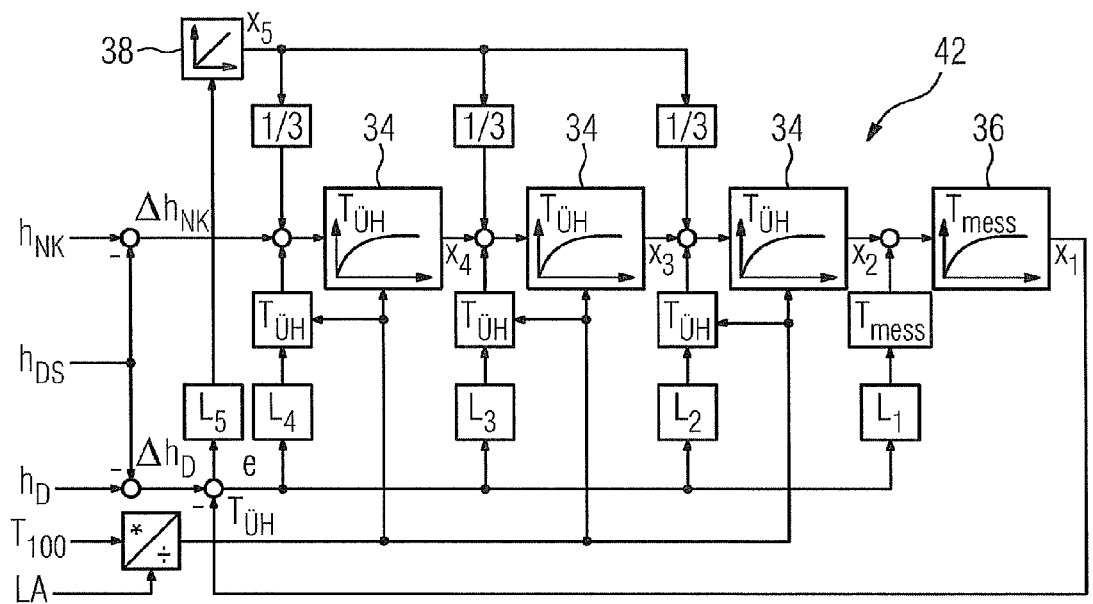
FIG. 5 is as structure of an observer.

In the following, the observer is described also as the disturbance observer or the disturbance variable observer, since said observer monitors the disturbances. FIG. 5 shows the structure of the disturbance variable observer.

The state controller forms the controller output thereof as a weighted sum of the system states. In the case modeled here, said states are the outputs of the four $PT_1$ elements 34, 36. However, since no measurements of enthalpies exist along the superheater 6, these must be reconstructed with the aid of an observer.

The reconstruction of the system states is carried out with calculation of a dynamic system model in parallel with the real process. The deviation between measured variables from the process and the corresponding values determined with the system model is identified as the observer error e. The individual states of the system model are each corrected with a weighted observer error, so that the latter is stabilized. The weightings are designated observer gain $L_1$-$L_5$.

The "measured variable" in this case is the specific enthalpy $h_D$ of the live steam, which is calculated from the live steam temperature $\theta_D$ and the live steam pressure $p_D$.

For the system model, an observer model that is slightly modified in comparison to FIG. 3 is used. As the state variables, it is not the absolute specific enthalpies that are selected, but rather the deviation thereof from the enthalpy target value $h_{DS}$ for the live steam 10, as the states were previously defined in the description of the state controller.

One input into the system model is the specific enthalpy $h_{NK}$ following the cooler 12. Said enthalpy is formed directly from the measured value of the temperature $\theta_{NK}$ after the cooler 12 and the associated pressure $p_{NK}$.

The second input into the system model is the disturbance variable $q_F$, which is not measurable, but is to be reconstructed. The observer model is therefore extended at this point by a state $x_5$. An integrator 38 provides the estimated heat flow into the system model. The only connection of the integrator input is the observer error, weighted with $L_5$, for correction.

The system matrices of the observer model—without feeding back through the observer gains—are given by $$A_O = \begin{bmatrix} \frac{-1}{T_{mess}} & \frac{1}{T_{mess}} & 0 & 0 & 0 \\ 0 & \frac{-1}{T_{\ddot{U}H}} & \frac{1}{T_{\ddot{U}H}} & 0 & \frac{1}{3T_{\ddot{U}H}} \\ 0 & 0 & \frac{-1}{T_{\ddot{U}H}} & \frac{1}{T_{\ddot{U}H}} & \frac{1}{3T_{\ddot{U}H}} \\ 0 & 0 & 0 & \frac{-1}{T_{\ddot{U}H}} & \frac{1}{3T_{\ddot{U}H}} \\ 0 & 0 & 0 & 0 & 0 \end{bmatrix},$$

$$b_O = \begin{bmatrix} 0 \\ 0 \\ 0 \\ \frac{1}{T_{\ddot{U}H}} \\ 0 \end{bmatrix} \text{ and } c_O^T = [\,1\ \ 0\ \ 0\ \ 0\ \ 0\,].$$

The subscript O stands for observer. It is noticeable that the state $x_5$ which represents the heat flow $q_F$ is not controllable, although it is observable.

The disturbance variable observer described here requires for the reconstruction of the system states ($x_1$ to $x_4$) and the disturbance variable ($x_5$) only measured values or variables derived from measured values—the specific enthalpy $h_{NK}$ before and $h_D$ after the superheater 6. No actuating signals from a controller are required, since no model of the actuator dynamic is included. Thus an observer implemented in the control system can run at any time, regardless of what kind of controlling structure is included, i.e. switching off the state controller or temporary replacement with another control structure does not influence the observer.

The observer gain, identified in FIG. 5 with the weightings $L_1$ to $L_5$, is chosen such that the observer error e is stabilized and correspondingly rapidly decays. This corresponds to the regulation of the dual system (with the symmetry matrices $A_D = A_O^T$, $b_D = c_O$ and $c_D^T = b_O^T$ index D for dual) by a state controller.

If the dimensioning of the observer gain is not undertaken by fixed stipulation of the observer poles, but through the design of an LQR for the dual system, then a Kalman filter is obtained. The weightings $Q_O$ and $r_O$ then correspond to the covariances of the system noise and of the measurement noise.

The associated matrix Riccati differential equation is then, similarly to the LQR design $$-\frac{dP_O}{dt} = A_D^T P_O + P_O A_D - \frac{1}{r_O} P_O b_D b_D^T P_O + Q_O$$

and the observer gain is given, in the static solution $P_O$ as $$L = \begin{bmatrix} L_1 \\ L_2 \\ L_3 \\ L_4 \\ L_5 \end{bmatrix} = \left(\frac{1}{r_O} b_D^T P_O\right)^T. \tag{7}$$

This equation relating the feedback vector L to the constant parameter $b_D^T$ serves for calculating the observer gain $L_1$ to $L_5$.

Figure 6:
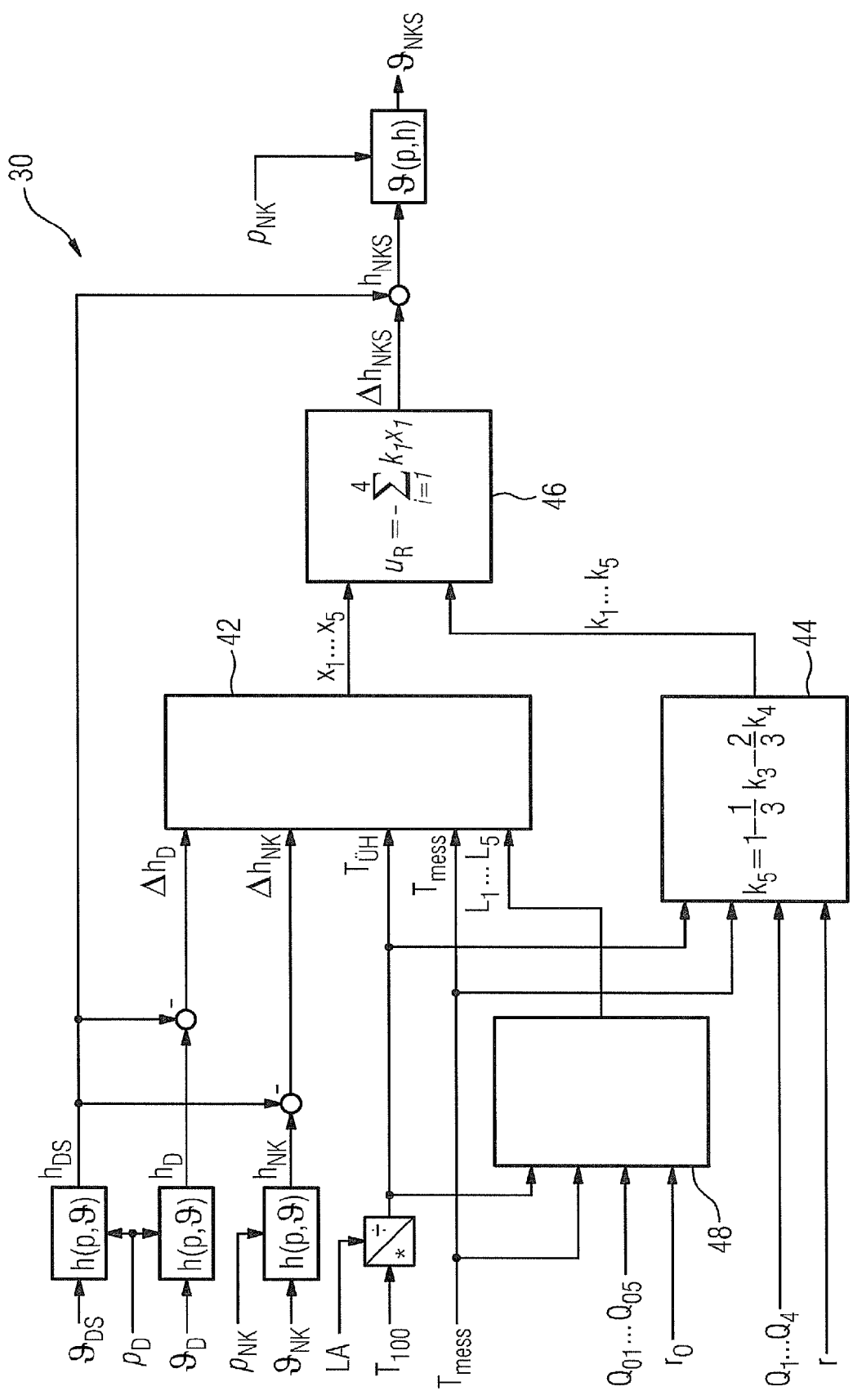
FIG. 6 is an overview of a controller structure.

An overview of the structure of the LQG controller 30 as a state controller is shown in FIG. 6. Firstly a conversion of temperatures to enthalpies is carried out with the aid of steam tables. The controller gain $k_1$ to $k_5$ and observer gain $L_1$ to $L_5$ are calculated depending on the time constants, the setting parameters and the load of the steam power plant 2.

The observer 42 shown in FIG. 5 provides the states $x_1$ to $x_4$ and the observed disturbance variable $x_5 = q_F$. The controller gain $k^T$ or $k_1$ to $k_4$ (Equation 6) and the weighting $k_5$ of the disturbance variable compensation (Equation 2) provides the MRDE (Equation 5). The observer gain L supplies an MRDE observer 48 from Equation 7. A state controller 46 brings about the feedback according to Equations 1-4, wherein the disturbance variable compensation $-k_5 x_5$ is already integrated into the cumulative representation i=1-5 of the state controller 46. Subsequently, renewed conversion is performed with the steam table, in order to convert the enthalpy target value $h_{NKS}$ after the injection cooler 6 into a temperature target value. The latter can then be used for controlling the injection valve.

The state controller 30 shown in FIG. 6 is not to be parameterized with constant gain factors $k_1$ to $k_4$ and $L_1$ to $L_5$, but with the time constants of the system and the adjustment of the weighting factors. In addition, the optimum gain factors are not constant, since the time constants of the system model are load-dependent. The solution of the matrix Riccati equations must therefore be carried out within the control technology which has the relevant parameters available at every time point. An initial integration of the matrix Riccati differential equations (MRDE) is therefore not useful.

Using the MRDE specified above, it is actually only the stationary solution that is sought for each operating point, i.e. the right side of the MRDE is set to zero and the result is an algebraic Riccati equation (ARE). Effective algorithms which can, however, be implemented without difficulty in control technology exist for solving this quadratic matrix equation.

For this reason, a different route has been chosen in this case, suited by means of the load-dependent time constants, in particular, to the time-variant character of the system equations: the MRDE is solved by integration over time. However, the equation is unstable on forward integration and is therefore suitably integrated backwards over time. By means of a simple sign reversal, a DGL is produced which is stable during forward integration and has the same stationary solution. Only with time-varying processes, i.e. during load changes and on changes to the setting parameters, does the solution found by forward integration deviate from the theoretically optimum solution form, which can only be found by backward integration.

The implementation of the above proposed controller concept in the control technology is undertaken by using standard components, i.e. for the four basic calculation types and integrators. These components operate exclusively with scalar variables in the control technology. No vector-value or even matrix-value signals and thus, for example, also no components for a product of two matrices exist.

Therefore, the matrix Riccati differential equations needed for calculating the controller gain k and the observer gain L are converted into a set of scalar differential equations. For this purpose, the system matrices for the actual problem are inserted into the MRDE and multiplied out. The result is scalar equations for the individual matrix entries $dP_{i,j}/dt$.

The MRDE is symmetrically constructed. For the weighting matrix Q if, as stated above, only the main diagonal is occupied, the result therefrom is that the matrix entries $P_{i,j}$, and $P_{j,i}$ converge on the same value and from there always overlap one another. The differential equations for these matrix entries are correspondingly identical if $P_{i,j}$ is set=$P_{j,i}$. If this symmetry property is made use of, consideration of a triangular matrix is sufficient.

For calculation of the 4×4 matrix P of the controller, 10 scalar differential equations are sufficient, in place of 16. Accordingly, for the 5×5 matrix $P_O$ of the observer, 15 rather than 25 differential equations are sufficient.

The observer gains can be calculated grouped together in one macro component 48 of the control technology. The macro component therefore needs the setting parameters $r_O$ and $Q_{O1}$ to $Q_{O5}$, the measuring element time constant $T_{mess}$ and the superheater time constant $T_{ÜH}$, which is calculated from $T_{100}$ and the load signal LA. For each of the 15 differential equations, there is a separate sub-macro which implements the right side of the DGL and an integrator for the respective state $P_{Oij}$.

The system model for the observer 42 is built into one macro block according to FIG. 5. Only the formation of the enthalpy deviations takes place outside the macro block. The $PT_1$ elements 34, 36 are constructed as integrators with feedback having the time constant of 1 second. The correction term ($L_j$ e) acts directly on the input of each integrator, so that multiplication by the respective time constant is unnecessary.

The conversion of temperature values to enthalpy values can be carried out at the outermost level of the controller component macro-block. Calling of the steam tables requires both the temperature and the associated pressure. For the live steam temperature, this is the live steam pressure and for the temperature following the injection cooler, the corresponding pressure before the superheater. The latter is often not available, but can be replaced with the live steam pressure, since the pressure loss across the superheater has no noticeable influence. Although the absolute enthalpy value at the input to the superheater changes slightly, the main enthalpy growth across the superheater is given by the heat uptake. The purpose of this conversion to enthalpies is the transfer into a linear system. Slight enthalpy errors therefore lead to slight non-linearities. However, due to forward and backward calculation with the same pressure value, no overall errors are produced.

For the conversion between temperatures and enthalpies, the pressure provides a type of operating point for the linearization. The pressure therefore represents the load-dependency of the conversion. It is therefore not important to feed every little pressure variation to the control component; rather what is needed, is the "nominal" pressure associated with the load. The frequently occurring rapid variations in the pressure measurement are therefore sufficiently smoothed, for example, by means of a $PT_1$ member having a time constant of ten minutes. If different pressure signals are used for the live steam pressure and the pressure after the injection cooler, then similar smoothing of both of the signals should be ensured.

As stated, the controller implemented is optimal with regard to a quality criterion that takes account of the control quality and the control effort. The control quality is determined by means of the weighting matrix Q, or, in the case implemented here, the diagonal entries $Q_1$ to $Q_4$.

The setting parameter r weights the control effort in the quality criterion in relation to the control quality. A relatively large value has a smoother control course with a simultaneous loss in control quality, and a smaller value leads to a sharper control behavior.

The selection of the quality criterion is independent of the actual plants having different system time constants. Theoretically, when the control component is used with a different plant, it is sufficient to match the time constants. However, it is entirely possible for different severities of control response to be required from one plant to the next. The main parameter for this is r.

The covariance matrix $Q_O$ of the Kalman filter reveals the covariance of the state noise of the observer model. Here also, only the diagonal elements are occupied. A small covariance value signifies that the respective state is very well described by the model equation. A large value, however, denotes that there is a large stochastic deviation. In the case of the observer model implemented, the three $PT_1$ elements 34, 36 model the response behavior of the superheater relatively well. However, the disturbance variable to be observed, namely the specific heat flow $q_F$, is not modeled at all. This state changes purely by reason of disturbance variables. The noise from this state therefore has a large covariance.

The remaining setting parameter $r_O$ gives the covariance of the measuring noise. Again, this can be seen in the relationship with the covariance of the state noise. A large value signifies that the measurement is subject to a large amount of noise, and that greater reliance should be placed on the prediction of the observer model. A small value of $r_O$ denotes, however, that the measurement is good and a possibly occurring observer error should be corrected correspondingly severely. The speed of the observer or of the Kalman filter can therefore be set by means of $r_O$. Acceleration of the observer is possible by making $r_O$ smaller.

The invention claimed is:

1. A method for controlling the temperature of steam for a steam power plant, comprising:

feeding back a plurality of steam states of a superheater for superheating steam by a state controller using an observer;

calculating the plurality of steam states by the observer, and using a model of a controlled system of the superheater, wherein a temporal delay is determined by a quotient of a time constant and a load signal;

feeding back the plurality of steam states by the observer for an output of a steam target temperature as a manipulated variable; and forwarding the steam target temperature to a further controller for controlling a temperature of the steam, wherein the state controller is a linear quadratic regulator (LQR) and the observer is a Kalman filter designed for linear quadratic state feedback, the LQR and the Kalman filter forming a linear quadratic Gaussian (LQG) controller, wherein a cascade control system is used for the controlling, the cascade control system comprising an outer cascade and an inner cascade, the outer cascade comprising the LQG controller and the inner cascade comprising a PI controller.

2. The method as claimed in claim 1, wherein a disturbance variable of heat transferred by the superheater to the steam is defined as a state and is used in a control algorithm.

3. The method as claimed in claim 1, wherein the observer determines heat transferred in the superheater to the steam.

4. The method as claimed in claim 3, wherein the heat transferred to the steam in the superheater is determined by an integrator.

5. The method as claimed in claim 1, wherein a plurality of enthalpies of the steam are used as state variables.

6. The method as claimed in claim 5, wherein deviations of absolute enthalpies from a plurality of enthalpy target values are used as the state variables.

7. The method as claimed in claim 1, wherein a mathematical controller problem is linearized by converting a plurality of measured temperature values and a plurality of temperature target values to enthalpies.

8. The method as claimed in claim 1, wherein state feedback takes place via a matrix equation, wherein parameters of the matrix equation are determined at least partially using updated measured values.

9. The method as claimed in claim 8, wherein the matrix equation is calculated using control technology of a steam power plant.

10. The method as claimed in claim 8, wherein the matrix equation is converted into a set of scalar differential equations.

11. The method as claimed in claim 10, wherein the set of scalar differential equations is solved by integration with signs reversed.

12. The method as claimed in claim 1, wherein the observer functions independently of the state controller.

13. A device for controlling the temperature of steam for a steam power plant, comprising:
 a state controller for outputting a steam target temperature as a manipulated variable by feeding back a plurality of steam states of a superheater for superheating steam;
 an observer which calculates the plurality of steam states via a model of a controlled system of the superheater, wherein a temporal delay is determined by a quotient of a time constant and a load signal; and
 a further controller for controlling a steam temperature on the basis of the steam target temperature,
 wherein the state controller is a linear quadratic controller (LQR) and the observer is a Kalman filter designed for linear quadratic state feedback, the LQR and the Kalman filter forming a linear quadratic Gaussian (LQG) controller,
 wherein a cascade control system is used for the controlling, the cascade control system comprising an outer cascade and an inner cascade, the outer cascade comprising the LQG controller and the inner cascade comprising a PI controller.

14. The device as claimed in claim 13, wherein a disturbance variable of heat transferred by the superheater to the steam is defined as a state and is used in a control algorithm.

15. The device as claimed in claim 13, wherein the observer determines heat transferred in the superheater to the steam.

16. The device as claimed in claim 15, wherein the heat transferred to the steam in the superheater is determined by an integrator.

17. The device as claimed in claim 13, wherein a plurality of enthalpies of the steam are used as state variables.

* * * * *